US012670617B2

(12) United States Patent
Huang

(10) Patent No.: US 12,670,617 B2
(45) Date of Patent: Jun. 30, 2026

(54) METHOD AND SYSTEM FOR INTELLIGENTLY CONTROLLING CHILDREN'S USAGE OF SCREEN TERMINAL

(71) Applicants:ZHEJIANG LINGCHUANG NETWORK TECHNOLOGY CO., LTD., Hangzhou City (CN); DONGSHENG SHENZHOU TOURISM MANAGEMENT CO., LTD., Ningbo City (CN)

(72) Inventor: Shuicai Huang, Hangzhou City (CN)

(73) Assignees: ZHEJIANG LINGCHUANG NETWORK TECHNOLOGY CO., LTD., Hangzhou City (CN); DONGSHENG SHENZHOU TOURISM MANAGEMENT CO., LTD., Ningbo City (CN)

( * ) Notice: Subject to any disclaimer, the term of this patent is extended or adjusted under 35 U.S.C. 154(b) by 510 days.

(21) Appl. No.: 18/296,175

(22) Filed: Apr. 5, 2023

(65) Prior Publication Data

US 2023/0237699 A1      Jul. 27, 2023

Related U.S. Application Data

(63) Continuation of application No. PCT/CN2022/113472, filed on Aug. 19, 2022.

(30) Foreign Application Priority Data

Sep. 17, 2021   (CN) .......................... 202111092773.3

(51) Int. Cl.
G06T 7/73      (2017.01)
G06T 7/593      (2017.01)
G06V 40/16      (2022.01)

(52) U.S. Cl.
CPC ................ G06T 7/74 (2017.01); G06T 7/593 (2017.01); G06V 40/165 (2022.01);
(Continued)

(58) Field of Classification Search
CPC . G06T 7/74; G06T 7/593; G06T 2207/10012; G06T 2207/10028; G06T 2207/30201; G06V 40/165; G06V 40/178
See application file for complete search history.

(56) References Cited

U.S. PATENT DOCUMENTS

| | | | | |
|---|---|---|---|---|
| 9,990,033 B2 * | 6/2018 | Fu | ........................ | G06V 40/171 |
| 2010/0277411 A1 * | 11/2010 | Yee | .......................... | G06F 3/017 |
| | | | | 382/103 |
| 2021/0233273 A1 * | 7/2021 | Spurr | .................... | G06F 18/217 |

FOREIGN PATENT DOCUMENTS

| | | |
|---|---|---|
| CN | 103729981 A | 4/2014 |
| CN | 109271028 A | 1/2019 |

(Continued)

OTHER PUBLICATIONS

Allowed claims of corresponding CN Application CN113807252B, 2 pages.

(Continued)

*Primary Examiner* — Matthew C Bella
*Assistant Examiner* — Jinsu Hwang
(74) *Attorney, Agent, or Firm* — MUNCY, GEISSLER, OLDS & LOWE, P.C.

(57) ABSTRACT

A method and a system for intelligently controlling children's usage of a screen terminal are provided in this disclosure, which relate to the technical field of intelligent home terminals. When children use the screen terminal, children's age can be automatically and intelligently identified, real-time intelligent supervision on children's sitting posture, distance and other aspects can be conducted accord- (Continued)

Collecting an image of a target area to obtain a target image — S10

Performing face detection on the target image — S20

Performing feature value extraction on a face with a preset facial feature model when the face is detected — S30

Matching an extracted feature value with a pre-trained face data set, and obtaining human bone position information in the target image — S40

Performing stereo rectification on the human bone position information so as to obtain human bone relation information and human body distance information — S50

Determining whether a sitting posture condition and/or a distance condition are abnormal according to the human bone relation information and the human body distance information, so as to realize intelligent control — S60 ing to different children's ages, so as to intelligently control on and off duration of the screen terminal, so as to guide the children to use the screen terminal device healthily. Compared with prior art schemes, in the disclosure, management of the screen terminal device can be realized without manual operation, reducing trouble from manual equipment management, further realizing specific control of children's usage of the screen terminal by age, increasing intelligence degree, and with advantage of being used in multiple scenes.

20 Claims, 4 Drawing Sheets

(52) U.S. Cl.
CPC .. *G06V 40/178* (2022.01); *G06T 2207/10012* (2013.01); *G06T 2207/10028* (2013.01); *G06T 2207/30201* (2013.01)

(56) References Cited

FOREIGN PATENT DOCUMENTS

| | | |
|---|---|---|
| CN | 113807252 A | 12/2021 |
| JP | 2021111890 A | 8/2021 |
| WO | WO2017152649 A1 | 9/2017 |

OTHER PUBLICATIONS

Allowed claims of corresponding JP Application JP7540657B2, 5 pages.
Notice of Allowance of CN Application No. 202111092773.3, dated Dec. 28, 2023, 1 page.
Office Action of CN Application No. 202111092773.3, dated Aug. 10, 2023, 5 pages.
Office Action of CN Application No. 202111092773.3, dated Feb. 26, 2023, 7 pages.
Form 3 of IN Application No. 202317042526, 1 page.
Office Action of IN Application No. 202317042526, dated Jun. 27, 2025, 6 pages.
Decision to Grant issued in JP Application No. 2023-529007, dated Jul. 16, 2021, 5 pages.
Office Action of JP Application No. 2023-529007, dated Apr. 2, 2020, 5 pages.
Matsumoto et al., "Development of Real-time Face and Gaze Measurement System and Its Application to Intelligent Interfaces," IPSJ Transatctions on Computer Vision and Image Media, vol. 47, 16 pages.
Suzuki et al. The 20th Symposium on Sensing via Image Information, 2014, 13 pages.
Iwana et al., "The Surrounding Camera System for a Gazing Point Estimation on a Monitor," IEICE Technical Report, May 30, 2023, 10 pages.
Hotta, The Journal of the Institute of Image Information and Television Engineers, vol. 64, No. 4, 2010, 10 pages.

* cited by examiner

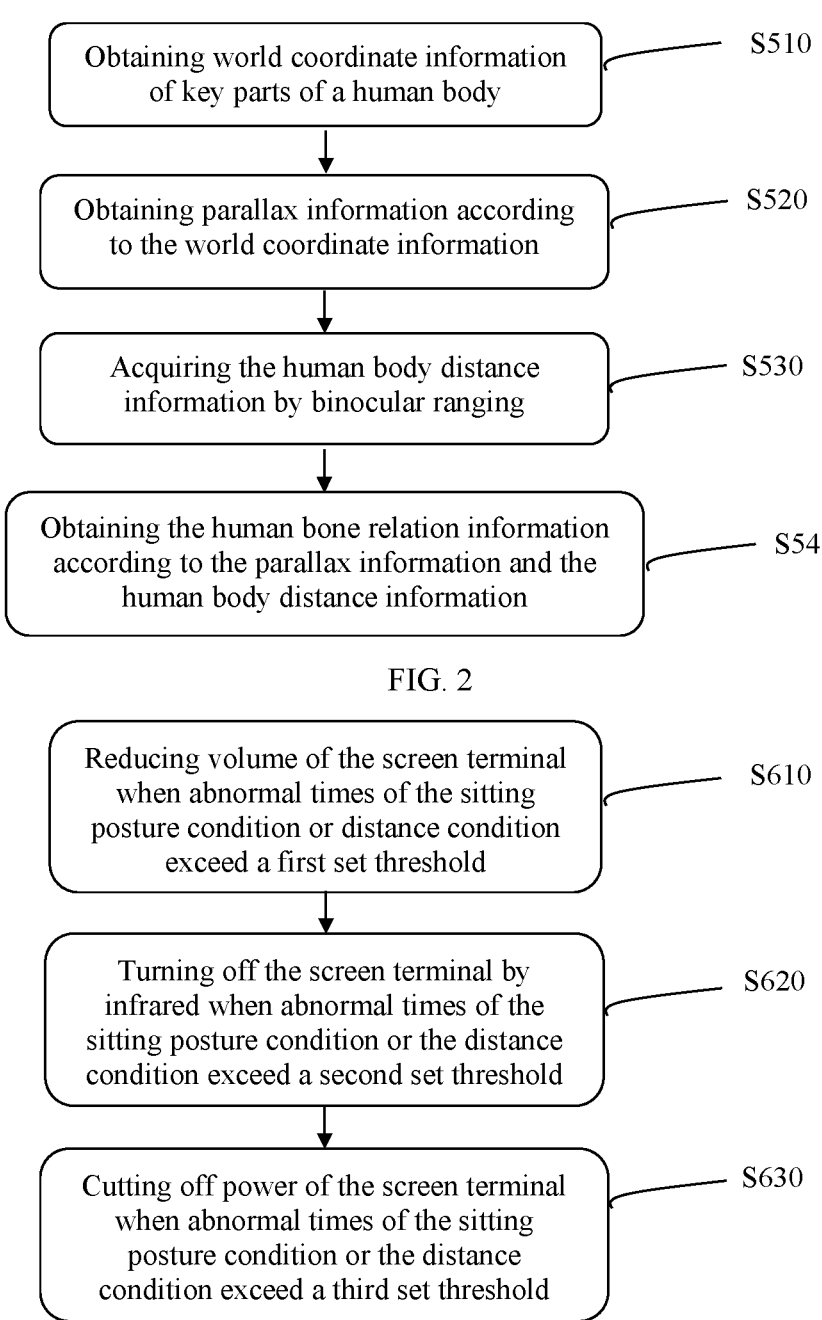

Obtaining world coordinate information
of key parts of a human body — S510

Obtaining parallax information according
to the world coordinate information — S520

Acquiring the human body distance
information by binocular ranging — S530

Obtaining the human bone relation information
according to the parallax information and the
human body distance information — S540

FIG. 2

Reducing volume of the screen terminal
when abnormal times of the sitting
posture condition or distance condition
exceed a first set threshold — S610

Turning off the screen terminal by
infrared when abnormal times of the
sitting posture condition or the distance
condition exceed a second set threshold — S620

Cutting off power of the screen terminal
when abnormal times of the sitting
posture condition or the distance
condition exceed a third set threshold — S630

METHOD AND SYSTEM FOR INTELLIGENTLY CONTROLLING CHILDREN'S USAGE OF SCREEN TERMINAL

CROSS REFERENCE TO RELATED APPLICATIONS

This application is a Continuation of co-pending Application No. PCT/CN2022/113472, filed on Aug. 19, 2022, for which priority is claimed under 35 U.S.C. § 120; and this application claims priority of application No. 202111092773.3 filed in China on Sep. 17, 2021 under 35 U.S.C. § 119, the entire contents of all of which are hereby incorporated by reference.

TECHNICAL FIELD

The disclosure relates to the technical field of intelligent home terminals, in particular to a method and a system for intelligently controlling children's usage of a screen terminal.

BACKGROUND ART

In recent years, a number of children with myopia and kyphosis caused by improper sitting posture is gradually increasing, and the improper sitting posture is one of main reasons for children's vision decline, which is very harmful to children's healthy development. Many children don't have correct awareness of sitting posture, which needs adults' reminding all the time. Especially using the screen terminal for a long time with non-standard sitting posture may lead to children's vision decline. Therefore, a method for intelligently controlling children's usage of a screen terminal is urgently needed.

In existing methods for managing screen terminals, it is generally necessary to manually manage screen terminal devices such as televisions by using application software or voice to control central control devices, which can't function in supervising children, that is, it can't supervise time for which children use electrical appliances, posture and states in children's using, etc. If parents want to check children's use of the screen terminal devices, it is necessary to remotely control cameras at their home. If it needs to manage the screen terminals, it also needs to turn on corresponding device management software to manually manage the devices, and thus a problem of being troublesome in use and not smart enough exists.

SUMMARY

An object of the present disclosure is to solve above problems mentioned in the background art, and to provide a method and a system for intelligently controlling children's usage of a screen terminal.

In order to achieve the above object, a method for intelligently controlling children's usage of a screen terminal is firstly proposed in the present disclosure, which includes: collecting an image of a target area to obtain a target image; performing face detection on the target image; performing feature value extraction on a face with a preset facial feature model when the face is detected; matching an extracted feature value with a pre-trained face data set, and when the feature value is matched with a first face data set in the face data set, obtaining human bone position information in the target image; performing stereo rectification on the human bone position information so as to obtain human bone relation information and human body distance information; determining whether a sitting posture condition and/or a distance condition are abnormal according to the human bone relation information and the human body distance information, and generating a reminder message for reminding when the sitting posture condition or the distance condition is abnormal; and outputting a corresponding control signal to control a screen terminal device when the sitting posture condition or the distance condition is abnormal and exceeds a set threshold, so as to realize intelligent control of children's use of the screen terminal.

Optionally, corresponding control of the screen terminal device when the sitting posture condition or the distance condition is abnormal and exceeds the set threshold specifically includes: reducing volume of the screen terminal when abnormal times of the sitting posture condition or the distance condition exceed a first set threshold; turning off the screen terminal by infrared when abnormal times of the sitting posture condition or the distance condition exceed a second set threshold; and cutting off power of the screen terminal when abnormal times of the sitting posture condition or the distance condition exceed a third set threshold.

Optionally, the method further includes: obtaining an age interval for a face template matched with the first face dataset data, and controlling the screen terminal to keep in an off mode when the face template is located in a first age interval; controlling the screen terminal to turn on for a first set time interval in a case that a child is detected to be in a first sitting posture and first distance condition, when the face template is in a second age interval; and controlling the screen terminal to turn on for a second set time interval in a case that the child is detected to be in a second sitting posture and second distance condition, when the face template is located in a third age interval.

Optionally, the method further includes: keeping the screen terminal in an off state for a fourth set time interval for every third set time interval in an on state when a date is a non-examination day.

Optionally, the performing stereo rectification on the human bone position information so as to obtain the human bone relation information and human body distance information specifically includes: obtaining world coordinate information of key parts of a human body; obtaining parallax information according to the world coordinate information; acquiring the human body distance information by binocular ranging; obtaining the human bone relation information according to the parallax information and the human body distance information.

Optionally, the obtaining the human bone relation information according to the parallax information and the human body distance information includes: |ordinate of right shoulder−ordinate of left shoulder|*(actual human body distance−standard measured human body distance)*(proportional rectification coefficient).

Optionally, first human bone relation information is obtained with left and right-eye world coordinates of a nose tip, and when the first human bone relation information is greater than a first parallax set threshold, the child is reminded to carry out horizontal correction on the human body.

Optionally, the first face data set is a face data set for 4 to 16 years old, and the second face data set is a face data set for over 16 years old.

Optionally, an infrared control device is configured to receive the corresponding control signal, and to reduce volume, turn off the screen terminal by infrared or directly cut off the power, so as to realize intelligent control of children's usage of the screen terminal according to the corresponding control signal.

A system for intelligently controlling children's usage of a screen terminal is provided in an embodiment of the disclosure, which includes an image collecting module configured to collect an image of a target area to obtain a target image; a face detection module configured to perform face detection on the target image; a feature value extraction module configured to perform feature value extraction on a face with a preset facial feature model when the face is detected; a face matching module configured to perform face matching on the face template with a pre-trained face data set; a human bone position information acquisition module configured to obtain human bone position information in the target image when the face template is matched with a first face data set in the face data set; a stereo rectification module configured to perform stereo rectification on the human bone position information so as to obtain human bone relation information and human body distance information; and an intelligent control module configured to determine whether a sitting posture condition and/or a distance condition are abnormal according to the human bone relation information and the human body distance information, and to generate a reminder message for reminding when the sitting posture condition or the distance condition is abnormal; and to output a corresponding control signal to control a screen terminal device when the sitting posture condition or the distance condition is abnormal and exceeds a set threshold, so as to realize intelligent control of children's use of the screen terminal.

The disclosure has advantages as follows:

With the method and system for intelligently controlling children's usage of the screen terminal provided in this disclosure, when children use the screen terminal, children's age can be automatically and intelligently identified, real-time intelligent supervision on children's sitting posture, distance and other aspects can be conducted according to different children's ages, so as to intelligently control on and off duration of the screen terminal, so as to guide the children to use the screen terminal device healthily. Compared with prior art schemes, in embodiments of the disclosure, management of the screen terminal device can be realized without manual operation, reducing trouble from manual equipment management, further realizing specific control of children's usage of the screen terminal by age, increasing intelligence degree, and with advantage of being used in multiple scenes.

Features and advantages of the present disclosure will be described in detail by examples with reference to accompanying drawings.

BRIEF DESCRIPTION OF THE DRAWINGS

FIG. 2 is another flow chart of a method for intelligently controlling children's usage of a screen terminal according to an embodiment of the present disclosure;

FIG. 3 is another flow chart of a method for intelligently controlling children's usage of a screen terminal according to an embodiment of the present disclosure;

DETAILED DESCRIPTION

In order to facilitate understanding of those skilled in the art, the present disclosure will be further described in detail below with reference to specific embodiments.

Figure 1:
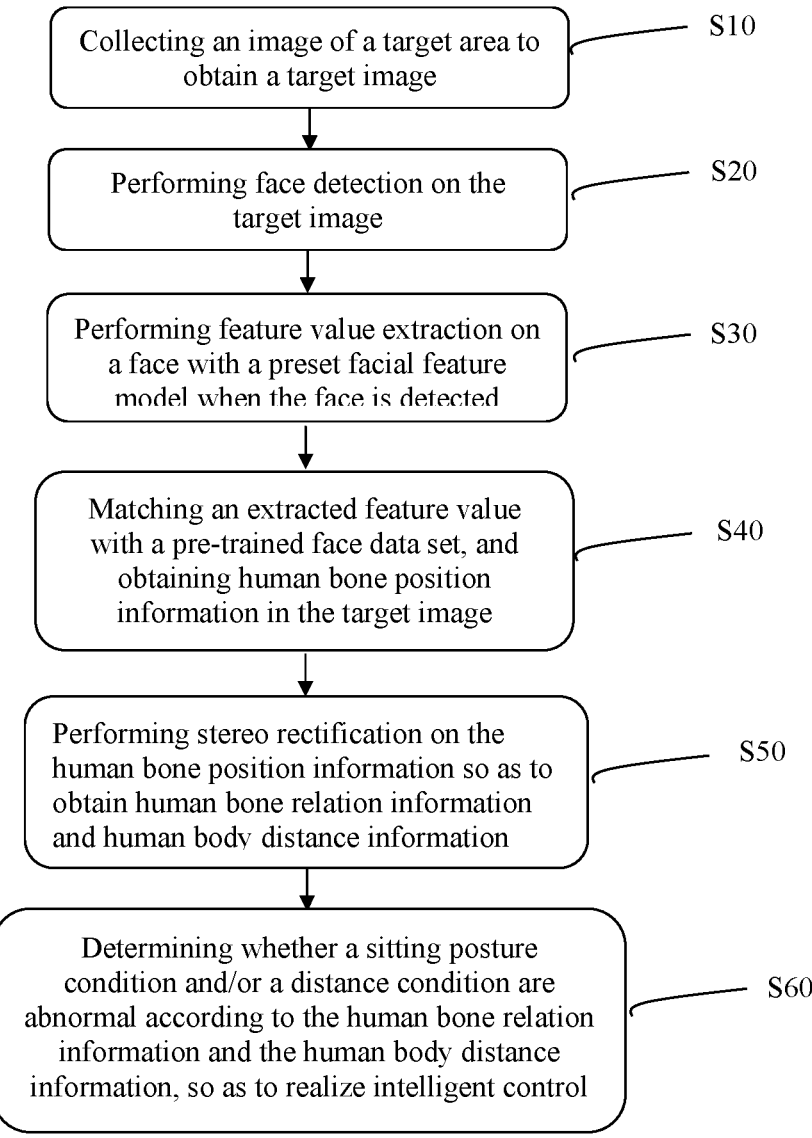
FIG. 1 is a flow chart of a method for intelligently controlling children's usage of a screen terminal according to an embodiment of the present disclosure.

Referring to FIG. 1, a method for intelligently controlling children's usage of a screen terminal is provided in an embodiment of the present disclosure, which includes following steps S10 to S60.

In step S10, an image of a target area to obtain a target image is collected.

In this embodiment, image collection is made by recording an image within a certain range from the screen terminal with one or more cameras, so as to generate target image information. The camera can be integrated into the screen terminal or placed outside of the screen. The camera is connected with a processing unit, and is configured to send the collected target image to the processing unit for subsequent series of processing. Specifically, the camera can be connected with the processing unit in a wired or wireless way for corresponding data transmission. The processing unit can be a processor integrated in the screen terminal or a processor in a central control device of Internet of Things, which includes but is not limited to Tmall Elf, Xiaodu and Xiaomi intelligent devices.

In step S20, face detection is performed on the target image.

A purpose of the face detection is to get any frame of the target image. The target image is searched with face detection algorithm to determine whether there is a face in the target image, because the target image may contain objects that are not faces, such as indoor furniture and other parts of a person (such as legs, shoulders and arms).

The face detection algorithm built in the processing unit can be configured to perform face detection on any frame of the target image. If there is a face in this frame, subsequent steps such as face feature extraction can be carried out. The face detection algorithm can be realized by using a classifier with OpenCV. OpenCV is an open source cross-platform computer vision library, which can be operated on Linux, Windows, Android and other operating systems, and can be used for image processing and development of computer vision applications.

In this embodiment, a yolo-based face detection algorithm is adopted for face detection. The target image is cut into 49 image blocks, and then each of the image blocks is measured to determine a face position. In addition, because the yolo-based face detection algorithm is configured to cut the target image into 49 image blocks, key parts such as eyelids can be refined in a subsequent feature extraction stage, thus improving accuracy of face feature extraction and face matching.

In other embodiments, a histogram of oriented gradient is adopted to detect the face position. Firstly, the target image is grayed, and then gradient of pixels in the image is calculated. The face position can be detected and obtained by converting the image into the histogram of oriented gradient.

In step S30, feature value extraction is performed on a face with a preset facial feature model when the face is detected.

In this embodiment, weight pruning is performed on age-differentiated parts such as wrinkles, eye-corners, eye bags, etc. on the face through a yolo-based darknet deep learning framework, thus realizing extraction of facial feature values.

In other embodiments, the pre-trained face feature model is adopted to perform feature value extraction on the face image to obtain the face template. The pre-trained face feature model can be obtained by calling a face recognition algorithm with the Facerecognizer class in OpenCV, such as Eigenfaces algorithm or Fisherfaces algorithm, which provides a general interface for the face recognition algorithm.

In step S40, an extracted feature value is matched with a pre-trained face data set, and when the feature value is matched with a first face data set in the face data set, human bone position information in the target image is obtained.

A feature regression method can be adopted to train with all the face feature values in the face data set. In a training result, the face data set is divided into the first face data set and a second face data set by attributes, and then matching is performed though a face attribute recognition method. In this embodiment, the first face data set is a face data set for 4 to 16 years old, and the second face data set is a face data set for over 16 years old.

In other embodiments, the first face data set is a face data set for 4 to 12 years old, and the second face data set is a face data set for over 12 years old.

In this embodiment, the face data set for 4 to 16 years old is adopted to avoid a situation that some children are excluded by the intelligent control system because their faces are mature and their actual age is less than their appearance age.

For application scenarios where children need to be classified according to a smaller age interval so as to carry out more refined and differentiated control, all of the face feature values in the face data set are trained to be divided into several face data sets with different intervals, and then children of different ages are measured differently.

Specifically, by using a face recognition method and by calculating an Euclidean distance between the target face and a weight vector of a respective person in the face database, children of different ages can be identified more accurately.

By matching feature values of the face in the target image with the first face data set, it can be determined that a face subject in the obtained target image belongs to an age interval represented by the first face data set.

In this embodiment, the children are aged 4 to 16 years, which is a subject for intelligently controlling children's usage of the screen terminal in the disclosure.

If there is no match, the face subject in the target image may be an adult over 16 years old or a child under 4 years old, which does not fall within a scope for intelligently controlling children's usage of the screen terminal in the disclosure.

When that face subject in the target image is within an age interval represented by the first face data set, the human bone position information in the target image is obtained. The human bone position information is world coordinates of key parts of a human body.

In step S50, stereo rectification is performed on the human bone position information so as to obtain human bone relation information and human body distance information.

Figures 4, 5:
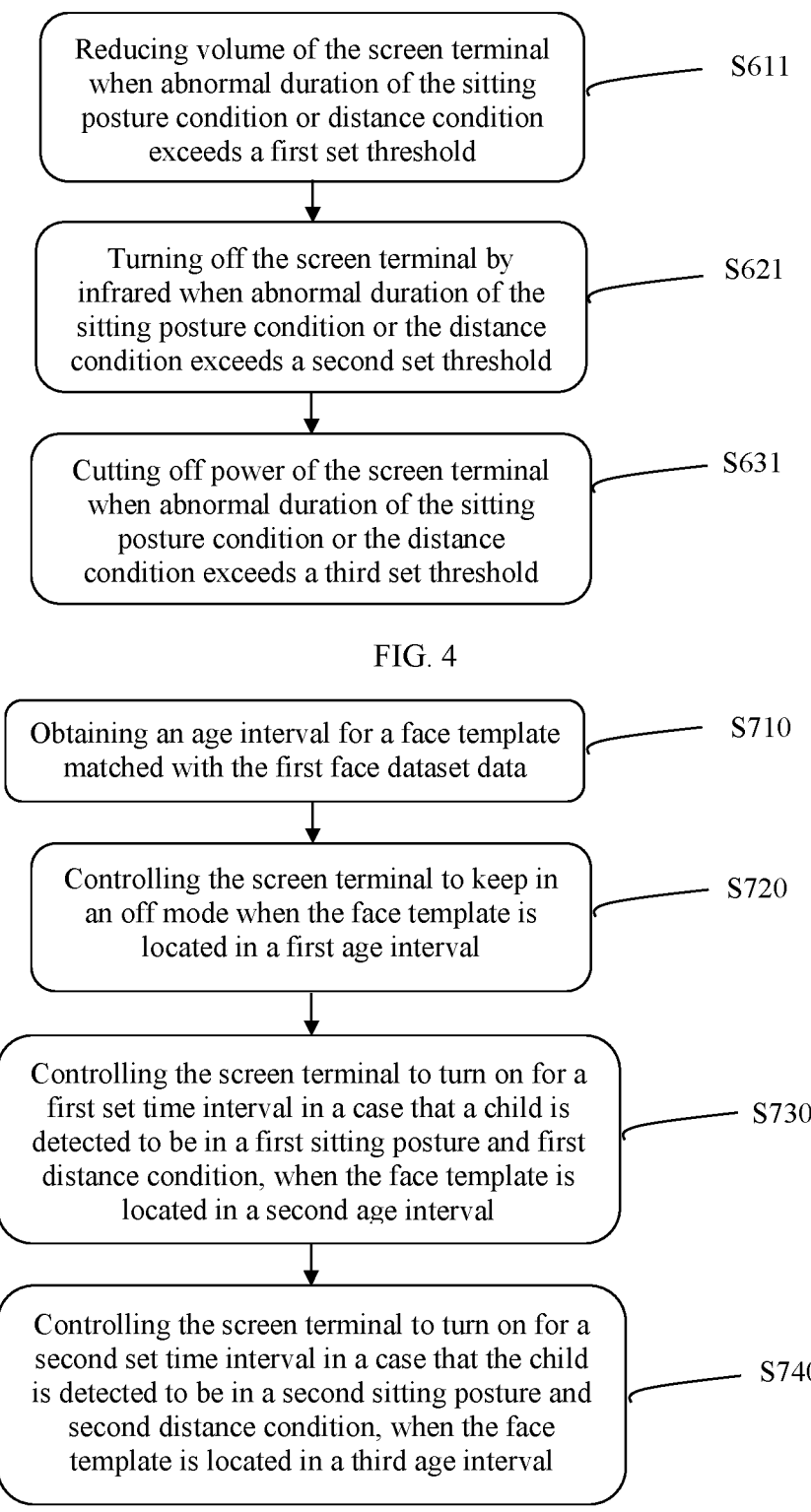
FIG. 4 is another flow chart of a method for intelligently controlling children's usage of a screen terminal according to an embodiment of the present disclosure.
FIG. 5 is another flow chart of a method for intelligently controlling children's usage of a screen terminal according to an embodiment of the present disclosure.

Referring to FIG. 5, a step in which stereo rectification is performed on the human bone position information so as to obtain human bone relation information and human body distance information specifically includes following steps S510 to S540.

In S510, world coordinate information of key parts of a human body is obtained, such as world coordinates of a shoulder, an eye, a nose tip and other parts. In this embodiment, the world coordinates of the nose tip are obtained.

In step S520, parallax information is obtained according to the world coordinate information, and parallax of key parts of the human body is measured according to the obtained world coordinate information. In this embodiment, the parallax is obtained by measuring left and right-eye world coordinates of the nose tip. The nose tip is located at a center of a human body, and the nose tip may only have parallax in abscissa. If the there's also large parallax in ordinate, the human body is not horizontal or the device is not horizontally placed. In other embodiments, world coordinate information of any number of bone positions can be selected to obtain the parallax information, for example, world coordinate information of left and right shoulders can be selected to obtain the parallax information, and specifically, it can be obtained with following formula: |ordinate of right shoulder−ordinate of left shoulder|.

In step S530, the human body distance information is acquired by binocular ranging, with a calculation formula of: human body distance information=actual human body distance−standard measured human body distance.

In prior art, because a zoom ratio and world coordinate difference may change in visual recognition when the human body is at different distances, the sitting posture measurement needs to be at a fixed distance. According to an embodiment of the disclosure, through binocular ranging, the distance can be accurately measured for proportional distance operation, and bones can be measured at any distance (within a limit of a visual distance), so that a more accurate sitting-posture result can be obtained.

In step S540, the human bone relation information is obtained according to the parallax information and the human body distance information. In this embodiment, first human bone relation information is obtained with left and right-eye world coordinates of the nose tip, and when the first human bone relation information is greater than a first parallax set threshold, the child is reminded to carry out horizontal correction on the human body.

In other embodiments, the left shoulder and the right shoulder are adopted as an example of respective key parts of the human body so as to obtain the human bone relation information, with a specific calculation formula of: |ordinate of right shoulder−ordinate of left shoulder|*(actual human body distance−standard measured human body distance)* (proportional rectification coefficient), where the proportional rectification coefficient can be preset by a relationship between the actual human body distance and the standard measured human body distance.

In step S60, it is determined whether a sitting posture condition and/or a distance condition are abnormal according to the human bone relation information and the human body distance information, and a reminder message is generated for reminding when the sitting posture condition or the distance condition is abnormal; and a corresponding control signal is output to control a screen terminal device when the sitting posture condition or the distance condition is abnormal and exceeds a set threshold, so as to realize intelligent control of children's use of the screen terminal.

Specifically, left-right shoulder relation information can be obtained according to bone position coordinates of the left and right shoulders of the human body, and then a left-right shoulder inclination angle can be obtained according to the left-right shoulder relation information, with a specific calculation formula as follows:

$$a\ left-right\ shoulder\ inclination\ angle =$$
$$\arctan\left(\frac{|\text{ordinate of left shoulder} - \text{ordinate of right shoulder}|}{|\text{abscissa of left shoulder} - \text{abscissa of right shoulder}|}\right) * \frac{180}{\pi}.$$

Finally, the sitting posture condition of the human body is determined according to the left-right shoulder inclination angle, when the left-right shoulder inclination angle exceeds a set threshold value of a shoulder inclination angle, the current sitting posture condition is determined to be abnormal, and reminding information is generated for reminding; when abnormal times of the sitting posture condition or abnormal duration of the sitting posture condition exceed a certain set threshold value, a corresponding control signal is output to control the screen terminal device, so as to realize intelligent control of children's use of the screen terminal.

Likewise, the human body distance information obtained by binocular ranging can be compared with a set distance threshold. When the human body distance information is less than the set threshold, the current distance condition is determined to be abnormal and a reminder message is generated for reminding. When abnormal times of the distance condition or abnormal duration of the distance condition exceed a set threshold, a corresponding control signal is output to control a screen terminal device so as to realize intelligent control of children's use of the screen terminal.

Referring to FIG. 3, in an embodiment of the disclosure, when the sitting posture condition or the distance condition is abnormal and exceeds the set threshold, corresponding control of the screen terminal device specifically includes following steps S610 to S630.

In step S610, volume of the screen terminal is reduced when abnormal times of the sitting posture condition or distance condition exceed a first set threshold.

In step S620, the screen terminal is turned off by infrared when abnormal times of the sitting posture condition or the distance condition exceed a second set threshold.

In step S630, power of the screen terminal is cut off when abnormal times of the sitting posture condition or the distance condition exceed a third set threshold.

Referring to FIG. 4, in other embodiments, when the sitting posture condition or the distance condition is abnormal and exceeds the set threshold, corresponding control of the screen terminal device specifically includes following steps S611 to S631.

In step S611, volume of the screen terminal is reduced when abnormal duration of the sitting posture condition or distance condition exceeds a first set threshold.

In step S621, the screen terminal is turned off by infrared when abnormal duration of the sitting posture condition or the distance condition exceeds a second set threshold.

In step S631, power of the screen terminal is cut off when abnormal duration of the sitting posture condition or the distance condition exceeds a third set threshold. Therefore, the first, second and third set thresholds are can be times or duration that can be set artificially.

With regard to corresponding control of the screen terminal, various protocols, including a MQTT protocol, can be adopted to send control signals from a data processor to relevant controlled screen terminal control devices, which include but are not limited to learning infrared controllers.

Embodiments of the present disclosure also have a function of differentiated supervision by different ages of children. Firstly, the face recognition technology is adopted to identify the children with a smaller age interval so as to obtain a plurality of age intervals, then an age interval in which a supervised children's face template is located is obtained, and targeted differentiated supervision is carried out according to the age interval in which the supervised children's face template is located. Specifically, reference is made to FIG. 5.

In step S710, an age interval for a face template matched with the first face dataset data is obtained.

In the S720, the screen terminal is controlled to keep in an off mode when the face template is located in a first age interval.

In step S730, the screen terminal is controlled to turn on for a first set time interval in a case that a child is detected to be in a first sitting posture and first distance condition, when the face template is located in a second age interval.

In step S740, the screen terminal is controlled to turn on for a second set time interval in a case that the child is detected to be in a second sitting posture and second distance condition, when the face template is located in a third age interval.

In addition, the screen terminal is kept in an off state for a fourth set time interval for every third set time interval in an on state, when it is detected that a date is a non-examination day.

Specifically, the age interval of the supervised children's face template can be obtained, and then it can be determined whether the supervised children are in a key examination time according to calendar time, and different supervision levels can be set according to their age interval. For example, level 0: examination time: no entertainment screen terminal (hereinafter replaced by TV) can be used; and level 1: a highest supervision mode in which watching TV can be made for only half an hour every day, with left and right shoulders kept horizontal and 3 meters away from the TV. Level 2: a next-most highest supervision mode in which watching TV can be made for 45 minutes every day, keeping 3° between left and right shoulders and be 2.5 meters away from the TV. Level 3: a weak supervision grade in which watching TV can be made for any number of times a day, but with 2.5 meters away from the TV and resting for 10 minutes every 45 minutes.

According to the embodiment of the disclosure, when children use the screen terminal, children's age can be automatically and intelligently identified, real-time intelligent supervision on children's sitting posture, distance and other aspects can be conducted according to different children's ages, so as to intelligently control on and off duration of the screen terminal, so as to guide the children to use the screen terminal device healthily. Compared with prior art schemes, in embodiments of the disclosure, management of the screen terminal device can be realized without manual operation, reducing trouble from manual equipment management, further realizing specific control of children's usage of the screen terminal by age, increasing intelligence degree, and with advantage of being used in multiple scenes.

Figure 6:
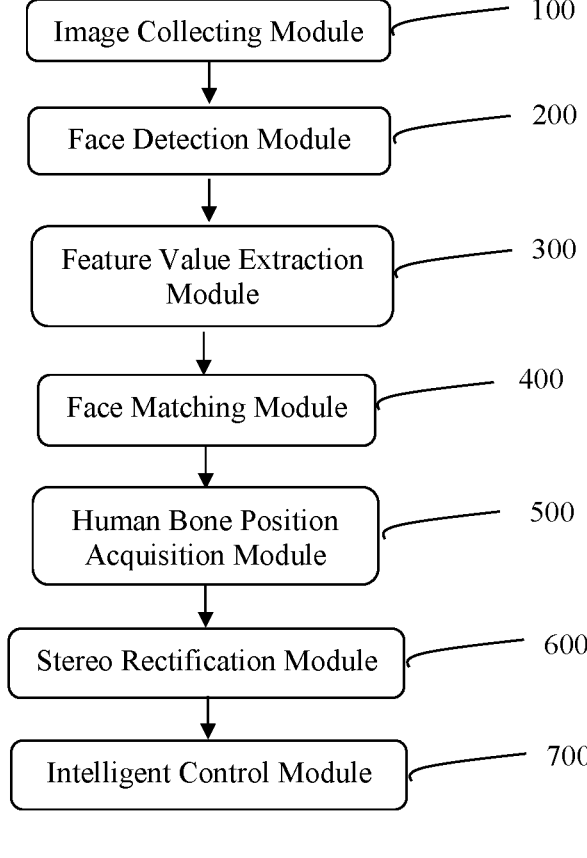
FIG. 6 is a block diagram of a system for intelligently controlling children's usage of a screen terminal according to an embodiment of the present disclosure.

In addition, based on the method for intelligently controlling children's usage of the screen terminal, a system for intelligently controlling children's usage of the screen terminal is further provided in an embodiment of the present disclosure. As shown in FIG. 6, the system includes an image collecting module 100, a face detection module 200, a feature value extraction module 300, a face matching module 400, a skeleton position acquisition module 500, a stereo rectification module 600, and an intelligent control module 700.

The image collecting module 100 is configured to collect an image of a target area to obtain a target image.

The face detection module 200 is configured to perform face detection on the target image.

The feature value extraction module 300 is configured to perform feature value extraction on a face with a preset facial feature model when the face is detected.

The face matching module 400 is configured to perform face matching on the face template with a pre-trained face data set.

The bone position acquisition module 500 is configured to obtain human bone position information in the target image when the face template is matched with a first face data set in the face data set.

The stereo rectification module 600 is configured to perform stereo rectification on the human bone position information so as to obtain human bone relation information and human body distance information.

The intelligent control module 700 is configured to determine whether a sitting posture condition and/or a distance condition are abnormal according to the human bone relation information and the human body distance information, and to generate a reminder message for reminding when the sitting posture condition or the distance condition is abnormal; and to output a corresponding control signal to control a screen terminal device when the sitting posture condition or the distance condition is abnormal and exceeds a set threshold, so as to realize intelligent control of children's use of the screen terminal.

To sum up, a system for intelligently controlling children's usage of the screen terminal is provided in the embodiment of the present disclosure, which can be implemented as a program and executed on computer device. Various program modules that make up the system for intelligently controlling children's usage of the screen terminal can be stored in a memory of the computer device, such as the image collecting module 100, the face detection module 200, the feature value extraction module 300, the face matching module 400, the bone position acquisition module 500, the stereo rectification module 600, and the intelligent control module 700 shown in FIG. 6. The program composed of respective program modules causes the processor to execute steps in a method for intelligently controlling children's usage of the screen terminal in various embodiments of the present disclosure described in this specification.

The above embodiments are illustrative, but not restrictive, of the present disclosure, and any simple transformation of the present disclosure falls within protection scope of the present disclosure. The above are only preferred embodiments of the present disclosure, and the protection scope of the present disclosure is not limited to the above embodiments. All technical solutions under idea of the present disclosure belong to the protection scope of the present disclosure. It should be pointed out that some improvements and modifications can be made by those of ordinary skilled in the art without departing from technical principle of the present disclosure, which should also be regarded to be within the protection scope of the present disclosure.

The invention claimed is:

1. A method for intelligently controlling children's usage of a screen terminal, comprising: collecting an image of a target area to obtain a target image by one or more cameras; performing face detection on the target image by a processor connected with the one or more cameras; performing, by the processor, feature value extraction on a face with a preset facial feature model when the face is detected; matching, by the processor, an extracted feature value with a pre-trained face data set, and when the feature value is matched with a first face data set and a second face data set in the pre-trained face data set, obtaining, by the processor, human bone position information in the target image; performing, by the processor, stereo rectification on the human bone position information so as to obtain human bone relation information and human body distance information; determining, by the processor, whether a sitting posture condition and/or a distance condition are abnormal according to the human bone relation information and the human body distance information, and generating, by the processor, a reminder message when the sitting posture condition or the distance condition is abnormal; and outputting, by the processor, a corresponding control signal to control a screen terminal device when the sitting posture condition or the distance condition is abnormal and exceeds a set threshold, so as to realize intelligent control of children's use of the screen terminal, wherein corresponding control of the screen terminal device by the processor when the sitting posture condition or the distance condition is abnormal and exceeds the set threshold specifically comprises: reducing volume of the screen terminal when abnormal times of the sitting posture condition or the distance condition exceed a first set threshold; turning off the screen terminal by infrared when abnormal times of the sitting posture condition or the distance condition exceed a second set threshold; and cutting off power of the screen terminal when abnormal times of the sitting posture condition or the distance condition exceed a third set threshold.

2. The method for intelligently controlling children's usage of the screen terminal according to claim 1, further comprising: obtaining, by the processor, an age interval for a face template matched with the first face dataset data, and controlling the screen terminal to keep in an off mode when the face template is located in a first age interval; controlling the screen terminal to turn on for a first set time interval in a case that a child is detected to be in a first sitting posture and first distance condition, when the face template is in a second age interval; and controlling the screen terminal to turn on for a second set time interval in a case that the child is detected to be in a second sitting posture and second distance condition, when the face template is located in a third age interval.

3. The method for intelligently controlling children's usage of the screen terminal according to claim 1, further comprising: keeping the screen terminal in an off state for a first set time interval for every second set time interval in an on state when a date is a non-examination day.

4. The method for intelligently controlling children's usage of the screen terminal according to claim 1, wherein the performing, by the processor, stereo rectification on the human bone position information so as to obtain the human bone relation information and human body distance information specifically comprises: obtaining world coordinate information of key parts of a human body; obtaining parallax information according to the world coordinate information; acquiring the human body distance information by binocular ranging; obtaining the human bone relation information according to the parallax information and the human body distance information.

5. The method for intelligently controlling children's usage of the screen terminal according to claim 4, wherein the obtaining the human bone relation information according to the parallax information and the human body distance information comprises: |ordinate of right shoulder−ordinate of left shoulder|*(actual human body distance−standard measured human body distance)*(proportional rectification coefficient).

6. The method for intelligently controlling children's usage of the screen terminal according to claim 1, wherein first human bone relation information is obtained by the processor with left and right-eye world coordinates of a nose tip, and when the first human bone relation information is greater than a first parallax set threshold, the child is reminded to carry out horizontal correction on a human body.

7. The method for intelligently controlling children's usage of the screen terminal according to claim 1, wherein the first face data set is a face data set for 4 to 16 years old, and the second face data set is a face data set for over 16 years old.

8. The method for intelligently controlling children's usage of the screen terminal according to claim 1, wherein an infrared control device is configured to receive the corresponding control signal, and to reduce volume, turn off the screen terminal by infrared or directly cut off the power, so as to realize intelligent control of children's usage of the screen terminal according to the corresponding control signal.

9. A method for intelligently controlling children's usage of a screen terminal, comprising:

collecting an image of a target area to obtain a target image by one or more cameras;

performing face detection on the target image by a processor connected with the one or more cameras;

performing, by the processor, feature value extraction on a face with a preset facial feature model when the face is detected;

matching, by the processor, an extracted feature value with a pre-trained face data set, and when the feature value is matched with a first face data set and a second face data set in the pre-trained face data set, obtaining, by the processor, human bone position information in the target image;

performing, by the processor, stereo rectification on the human bone position information so as to obtain human bone relation information and human body distance information;

determining, by the processor, whether a sitting posture condition and/or a distance condition are abnormal according to the human bone relation information and the human body distance information, and generating, by the processor, a reminder message when the sitting posture condition or the distance condition is abnormal;

outputting, by the processor, a corresponding control signal to control a screen terminal device when the sitting posture condition or the distance condition is abnormal and exceeds a set threshold, so as to realize intelligent control of children's use of the screen terminal;

obtaining, by the processor, an age interval for a face template matched with the first face dataset data, and controlling the screen terminal to keep in an off mode when the face template is located in a first age interval;

controlling the screen terminal to turn on for a first set time interval in a case that a child is detected to be in a first sitting posture and first distance condition, when the face template is in a second age interval; and controlling the screen terminal to turn on for a second set time interval in a case that the child is detected to be in a second sitting posture and second distance condition, when the face template is located in a third age interval.

10. The method for intelligently controlling children's usage of the screen terminal according to claim 9, wherein corresponding control of the screen terminal device by the processor when the sitting posture condition or the distance condition is abnormal and exceeds the set threshold specifically comprises:

reducing volume of the screen terminal when abnormal times of the sitting posture condition or the distance condition exceed a first set threshold;

turning off the screen terminal by infrared when abnormal times of the sitting posture condition or the distance condition exceed a second set threshold; and cutting off power of the screen terminal when abnormal times of the sitting posture condition or the distance condition exceed a third set threshold.

11. The method for intelligently controlling children's usage of the screen terminal according to claim 9, further comprising keeping the screen terminal in an off state for a first set time interval for every second set time interval in an on state when a date is a non-examination day.

12. The method for intelligently controlling children's usage of the screen terminal according to claim 9, wherein the performing, by the processor, stereo rectification on the human bone position information so as to obtain the human bone relation information and human body distance information specifically comprises:

obtaining world coordinate information of key parts of a human body;

obtaining parallax information according to the world coordinate information; acquiring the human body distance information by binocular ranging; and obtaining the human bone relation information according to the parallax information and the human body distance information.

13. The method for intelligently controlling children's usage of the screen terminal according to claim 12, wherein the obtaining the human bone relation information according to the parallax information and the human body distance information comprises: |ordinate of right shoulder−ordinate of left shoulder|*(actual human body distance−standard measured human body distance)*(proportional rectification coefficient).

14. The method for intelligently controlling children's usage of the screen terminal according to claim 9, wherein first human bone relation information is obtained by the processor with left and right-eye world coordinates of a nose tip, and when the first human bone relation information is greater than a first parallax set threshold, the child is reminded to carry out horizontal correction on a human body.

15. The method for intelligently controlling children's usage of the screen terminal according to claim 9, wherein the first face data set is a face data set for 4 to 16 years old, and the second face data set is a face data set for over 16 years old.

16. The method for intelligently controlling children's usage of the screen terminal according to claim 9, wherein an infrared control device is configured to receive the corresponding control signal, and to reduce volume, turn off the screen terminal by infrared or directly cut off the power, so as to realize intelligent control of children's usage of the screen terminal according to the corresponding control signal.

17. A method for intelligently controlling children's usage of a screen terminal, comprising:

collecting an image of a target area to obtain a target image by one or more cameras;

performing face detection on the target image by a processor connected with the one or more cameras;

performing, by the processor, feature value extraction on a face with a preset facial feature model when the face is detected;

matching, by the processor, an extracted feature value with a pre-trained face data set, and when the feature value is matched with a first face data set in the face data set, obtaining, by the processor, human bone position information in the target image;

performing, by the processor, stereo rectification on the human bone position information so as to obtain human bone relation information and human body distance information;

determining, by the processor, whether a sitting posture condition and/or a distance condition are abnormal according to the human bone relation information and the human body distance information, and generating, by the processor, a reminder message when the sitting posture condition or the distance condition is abnormal; and outputting, by the processor, a corresponding control signal to control a screen terminal device when the sitting posture condition or the distance condition is abnormal and exceeds a set threshold, so as to realize intelligent control of children's use of the screen terminal, wherein the performing, by the processor, stereo rectification on the human bone position information so as to obtain the human bone relation information and human body distance information specifically comprises:

obtaining world coordinate information of key parts of a human body;

obtaining parallax information according to the world coordinate information; acquiring the human body distance information by binocular ranging; and obtaining the human bone relation information according to the parallax information and the human body distance information, and wherein the obtaining the human bone relation information according to the parallax information and the human body distance information comprises: |ordinate of right shoulder−ordinate of left shoulder|*(actual human body distance−standard measured human body distance)*(proportional rectification coefficient).

18. The method for intelligently controlling children's usage of the screen terminal according to claim 17, wherein corresponding control of the screen terminal device by the processor when the sitting posture condition or the distance condition is abnormal and exceeds the set threshold specifically comprises:

reducing volume of the screen terminal when abnormal times of the sitting posture condition or the distance condition exceed a first set threshold;

turning off the screen terminal by infrared when abnormal times of the sitting posture condition or the distance condition exceed a second set threshold; and cutting off power of the screen terminal when abnormal times of the sitting posture condition or the distance condition exceed a third set threshold.

19. The method for intelligently controlling children's usage of the screen terminal according to claim 17, further comprising:

obtaining, by the processor, an age interval for a face template matched with the first face dataset data, and controlling the screen terminal to keep in an off mode when the face template is located in a first age interval;

controlling the screen terminal to turn on for a first set time interval in a case that a child is detected to be in a first sitting posture and first distance condition, when the face template is in a second age interval; and controlling the screen terminal to turn on for a second set time interval in a case that the child is detected to be in a second sitting posture and second distance condition, when the face template is located in a third age interval.

20. The method for intelligently controlling children's usage of the screen terminal according to claim 17, further comprising keeping the screen terminal in an off state for a first set time interval for every second set time interval in an on state when a date is a non-examination day.

* * * * *